(12) United States Patent
Fluhler

(10) Patent No.: US 10,871,360 B1
(45) Date of Patent: Dec. 22, 2020

(54) METHOD FOR COOLING MISSILES

(71) Applicant: Herbert U. Fluhler, Huntsville, AL (US)

(72) Inventor: Herbert U. Fluhler, Huntsville, AL (US)

( * ) Notice: Subject to any disclaimer, the term of this patent is extended or adjusted under 35 U.S.C. 154(b) by 108 days.

(21) Appl. No.: 15/911,065

(22) Filed: Mar. 2, 2018

Related U.S. Application Data

(60) Provisional application No. 62/466,283, filed on Mar. 2, 2017.

(51) Int. Cl.
| | |
|---|---|
| F25B 21/02 | (2006.01) |
| F41F 3/04 | (2006.01) |
| B64F 5/50 | (2017.01) |
| F42B 15/34 | (2006.01) |
| F41F 3/055 | (2006.01) |
| B64D 13/00 | (2006.01) |

(52) U.S. Cl.
CPC .............. F42B 15/34 (2013.01); B64F 5/50 (2017.01); F25B 21/02 (2013.01); F41F 3/055 (2013.01); *B64D 13/006* (2013.01); *F25B 2321/02* (2013.01)

(58) Field of Classification Search
CPC .......... B29C 65/30; F42B 15/34; F42B 39/18; F25B 21/02; F25B 2321/02; F25B 2321/021; B64D 13/006; B64F 5/50; F41F 3/055

USPC .............. 62/3.2, 3.5, 3.6, 3.7; 89/1.811
See application file for complete search history.

(56) References Cited

U.S. PATENT DOCUMENTS

| | | | |
|---|---|---|---|
| 5,983,771 A * | 11/1999 | Lehr ................. | F41F 3/055 89/1.55 |
| 7,765,811 B2 * | 8/2010 | Hershberger ....... | H01L 35/30 62/3.5 |
| 8,013,302 B2 * | 9/2011 | Meir ................. | F41G 7/224 250/338.4 |
| 8,037,798 B2 * | 10/2011 | Lance ............... | F41G 7/306 89/1.811 |
| 2009/0151321 A1 * | 6/2009 | Jarmon .............. | B64C 1/38 60/266 |
| 2010/0000237 A1 * | 1/2010 | Matsuoka .......... | F25B 9/008 62/77 |
| 2018/0045438 A1 * | 2/2018 | Oakes ............... | B29C 65/30 |

* cited by examiner

*Primary Examiner* — Len Tran
*Assistant Examiner* — Daniel C Comings
(74) *Attorney, Agent, or Firm* — Patent Grove LLC; Tomas Friend

(57) ABSTRACT

A system and method for cooling a missile includes an assembly of Peltier tiles configured to be reversibly attached to the skin of the missile with the cold sides of the Peltier tiles against the skin. The Peltier tiles are electrically powered to cool a portion of the missile skin. A thermally conductive paste or sheets of a heat conductive material may be placed between the Peltier tiles and missile skin. When the missile is launched, the assembly of Peltier tiles detach from the missile.

14 Claims, 4 Drawing Sheets

METHOD FOR COOLING MISSILES

FIELD OF THE INVENTION

This invention relates to cooling systems for air-to-air and ground-to-air missiles while the missiles are mounted to an aircraft prior to aircraft launch, as when the aircraft is in an alert state while awaiting a command to launch, or missiles in a ground based application where the missiles are in a standby, ready to fire state.

BACKGROUND OF THE INVENTION

Missiles are common in military aviation. In particular, air-to-air missiles are used by enemy combatants in air combat situations. Such missiles have become increasingly complex, having been provided since World War II with guidance and homing systems. As such, their electronics have also become increasingly complex. Along with this complexity has emerged a need for increased computing capability in order to calculate and maintain an intercept path to a target, which in turn has created increased heat. This heat is not a problem for a missile mounted to an aircraft in flight or after launch of a missile, as airflow around the missile and air temperature at altitude is sufficient to keep the missile cool. In some missile homing systems a cooled target detection seeker, usually an Infrared sensor, is used to detect a target and must be kept cool or cold through the use of a refrigeration system. This refrigeration system must expel the heat absorbed for cooling, plus will generate additional heat due to natural inefficiency in the refrigeration apparatus which adds to the heat load of the missile. Related to this, missiles with such seekers must be electrically activated in advance in order to cool the sensor to a prescribed cold operational temperature, which may take minutes to achieve with current state of the art. Considering that a modern fighter jet can be "scrambled" under optimal conditions in just under a couple of minutes, it is conceivable that a situation could arise where such a fighter jet hosting a cooled seeker missile might need to be ready to engage an enemy combatant prior to the seeker in the missile of the scrambled jet not being sufficiently cool for the missile to function properly.

There are also situations where an aircraft armed with an air-to-air missile must remain on a tarmac or flight deck in a ready or alert state. In these states, the aircraft may be electrically powered waiting for engine startup or takeoff. In other situations, the aircraft may be waiting on a taxiway prior to takeoff for a mission. In yet other states, an aircraft may be armed and electrically powered for maintenance purposes. In any case, a powered missile that is not cooled by airflow generates heat from its internal components. Such heat is detrimental to solid state electronics and other components used in most air-to-air missile systems and can prevent the proper functioning of both the internal missile electronics and in particular an organic cooled seeker, particularly of the Infrared seeker type. In addition, due to aerodynamic constraints, most air-to-air missiles are of a small cross section, which can allow heat to build quickly. This is compounded by the fact that there is no ventilation of the interior of the missile, which is completely sealed.

One example is the United States Sidewinder missile, designated generally as AIM-9, which is only 5 inches in diameter and a little less than 10 feet in length, most of which is propellant. In this particular missile, a portion of the missile around the front steering fins contains heat generating components and the Infrared seeker cooling refrigerator and associated dewar and coldfinger assembly that hosts the Infrared detector(s). Upon excessive internal heat generation and/or associated insufficient cooling, such assemblies may become sufficiently hot so as to become damaged, inoperable or otherwise adversely affect performance of the missile if not cooled by external airflow or other means for cooling. In particular, the Sidewinder's infrared detector in its seeker must be cold prior to launch to operate properly.

Another situation arises where air-to-air missiles are adapted for ground-to-air use. Here, it may be contemplated that an air-to-air missile may be tube mounted in a tube or other protective canister, with potentially multiple tubes or canisters in turn mounted in close proximity to each other on a vehicular platform. In this situation, the missiles are enclosed within the tube or canister for protection against the environment, and in a readiness state sitting in tubes generating heat both from standby electronics operation as well as operation of the aforementioned refrigeration apparatus cooling the seeker detector, dewar and coldfinger assemblies as appropriate to the particular missile. Additionally, when poised in a state of readiness for potential attack, multiple missiles may be operating within a multiplicity of closely spaced said closed tubes or canisters, thereby amplifying the overheating effect within the ensemble of closely spaced missiles in their respective tubes or canisters. Alternative means might be used to try to alleviate this overheating problem in either free standing missiles, missiles in singular tubes or canisters or in multiple missiles within dense packs of multiple tubes or canisters. A cooling system could be added to the missile, but this would require a major redesign of the missile which is prohibitively expensive and takes a very long time to be acquired through current military acquisition systems. It also increases the cost of the missile by a substantial amount, eliminates the attractiveness of using an existing already tested and fielded missile and may also end up decreasing the performance of the missile.

A cooling system, either air or fluid based, might be added to the host launcher system to provide cooling within or without the canister. Although this solution does not require reinventing the missile, it does require substantial redesign of the launcher, requiring the addition of a thermal management system (air conditioner/cooler), increasing the launcher and tube or canister complexity and inevitably increasing the size of the tubes or canisters, thereby likely decreasing the number that can be physically hosted on the vehicle platform, and increasing the cost of the launcher by a substantial amount, while also decreasing its reliability due to the added complexity of the thermal management system.

There are simpler methods that might be employed to cool the missiles, but they all have potentially unacceptable detractors. Only a fraction of the whole launcher's magazine of missiles might be turned on to be at the ready, but then obviously the rest of the magazine of missiles is not available for launch until they have first cooled down their Infrared detectors. Similarly a randomized few missiles might be cycled on and rotated with other missiles after a given on period, but this likewise makes only a fraction of the whole magazine available for immediate launch. Yet another approach might be to elevate the tube or canisters at a high elevation angle to promote vertical convective cooling over the tube or canister exteriors. A yet similar more effective approach might be to also open the front and rear covers while the tubes are pointed upward in order to generate a chimney circulation effect. Although it may be questionable whether this would generate sufficient airflow to keep the missile cool, a larger concern is the access permitted by such a scheme to the elements, permitting dirt, rain, etc. ready access to the missile and the tube/canister interior and the missile interface and power cables as well as the launch rail.

To date, Applicant is unaware of any exterior cooling system for cooling a missile, or at least portions of such a missile heated by interior heat generating components and/or associated refrigeration cooling mechanisms, while the missile or an aircraft to which the missile is mounted is not flying, or a tube/canister mounted missile as described above. Accordingly, Applicant proposes a system or method for cooling such a missile while it is powered and not airborne or otherwise cooled.

DETAILED DESCRIPTION OF THE DRAWINGS

Figure 1:
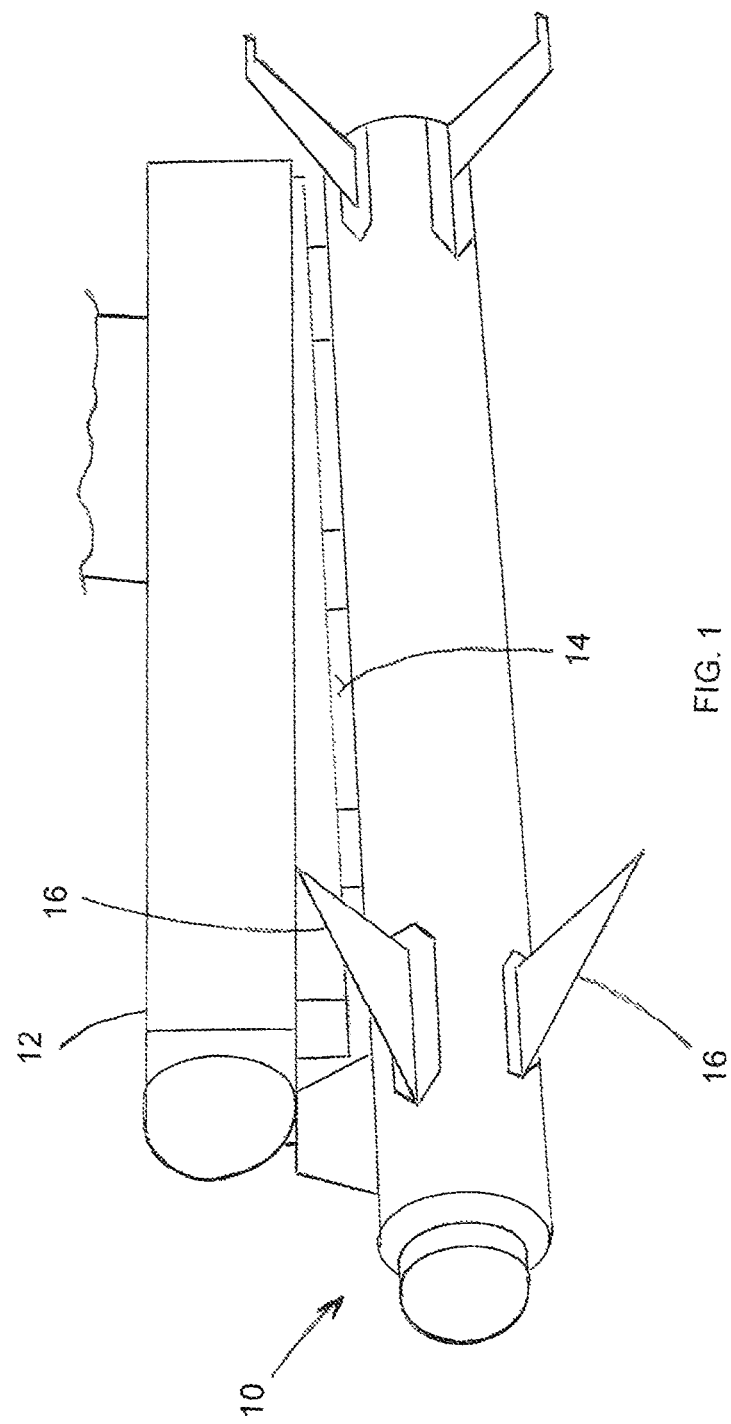
FIG. 1 is an illustration of a missile mounted to a launch rail of an aircraft.

Referring to FIG. 1, an air-to-air missile 10 is shown mounted to a launch rail or pylon 12 of an aircraft or inside a tube or canister. Missile 10 is supported on the rail by two or more T-shaped lugs that ride in a T-shaped track of the launch rail when the missile is launched. A gap 14 exists between missile 10 and the bottom of launch rail 12. As noted above and by way of example only, on a Sidewinder missile the forward portion of missile 10 where fins 16 are located has been identified to contain heat generating components, such as guidance and navigation components, and infrared seeker cooling refrigerator, that can become overheated while the missile is powered and not in flight. With other missiles, other portions of the missile may benefit from Applicant's approach for keeping such portions cool so as to prevent overheating.

Figure 2:
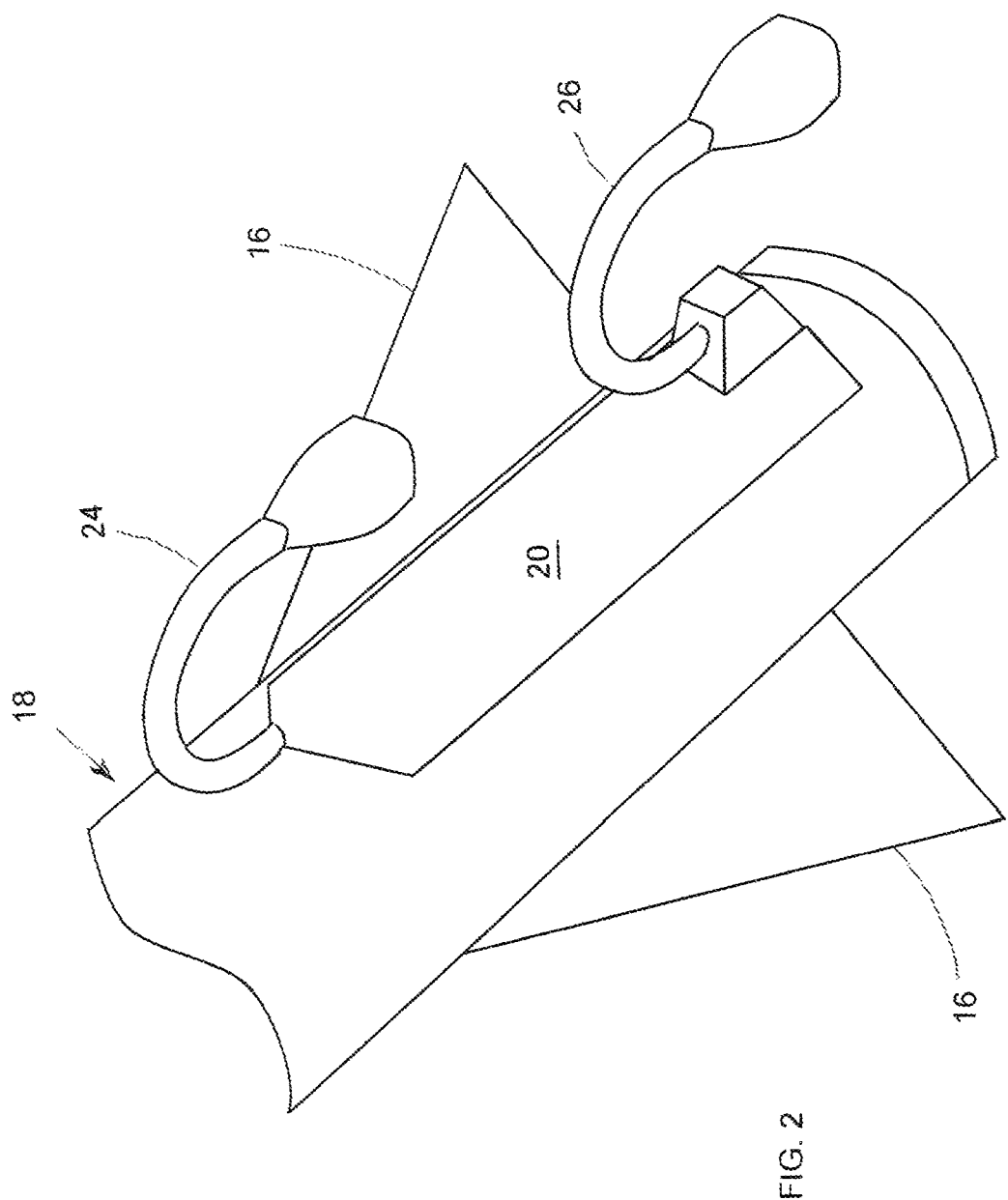
FIG. 2 is an illustration of a Peltier cooler assembly mounted to a missile skin.

FIG. 2 shows a forward portion 18 of missile 10 that may tend to overheat. Here, Applicant proposes to temporarily attach a substantially planar sheet assembly of Peltier cooler tiles 20 directly underneath rail launcher 12 and between fins 16 on forward portion 18 of missile 10, and underneath gap 14. As should be apparent, the hot side of the Peltier cooler tiles are facing outward, with the cold side of the Peltier cooler tiles in physical contact with the missile skin or surface to maximize heat extraction.

The assembly of Peltier Cooler tiles 20 might include a multiplicity of individual co-planar Peltier cooler tiles attached to each other with a thermally conductive thermal tape such as used by NASA for space applications. The assembly may be constructed in a manner that allows facile conformal flexing of the assembly to the shape of the body of the missile. Alternatively, a host frame or holder, perhaps of plastic or composite material, may secure the Peltier Cooler tiles in a tight substantially coplanar assembly. The frame or holder would allow exposure of the center part of the Peltier Cooler tiles on both sides for absorbing and rejecting heat as appropriate. Alternatively, the host frame or holder may be made of a suitable fabric holding the Peltier Cooler tiles with fabric stitching or within stitched pockets not unlike modern bullet proof body armor holds their ballistic ceramic tiles. A further alternative might be to construct the frame or holder from a metallic or thermally conductive composite material that is designed to be conformal to the missile body and hold the Peltier Cooler tiles at the requisite close proximity to the missile skin, and making available a thermal path for the expelled heat to flow to the exterior of the assembly. A final alternative could be to devise a singular (or very few) custom Peltier Cooler tile that is as large as the whole assembly needed, and is custom designed and constructed to naturally fit conformally onto the missile body at the location needed.

Regardless of the specific type of Peltier Cooler tile assembly selected, the assembly is first most retained within the space between the launch rail and the missile body. The retention may be further secured by means such as a foam or other flexible light material spacer and suitable light tack adhesives between the missile body and the launch rail to prevent the assembly from separating from the missile body, shifting or flopping when moved in transport. The Peltier Cooler tile assembly may also provide mechanical attachments such as fasteners, hooks, loops, clips, indents or other structures to provide secure retention to the fins or other attachment points on the missile. As such, the intent is ideally for the assembly to mechanically retained naturally within the confines of the launch rail, the missile body, and missile body protrusions (such as fins, attachment posts, electrical interface connectors, etc.)

The outer side of the Peltier Cooler tile assembly may provide some manner of thermal transfer assistance to expel the waste heat such as thermally conductive wires, threads or fins, not unlike cooling fins on traditional heat sinks.

Figure 3:
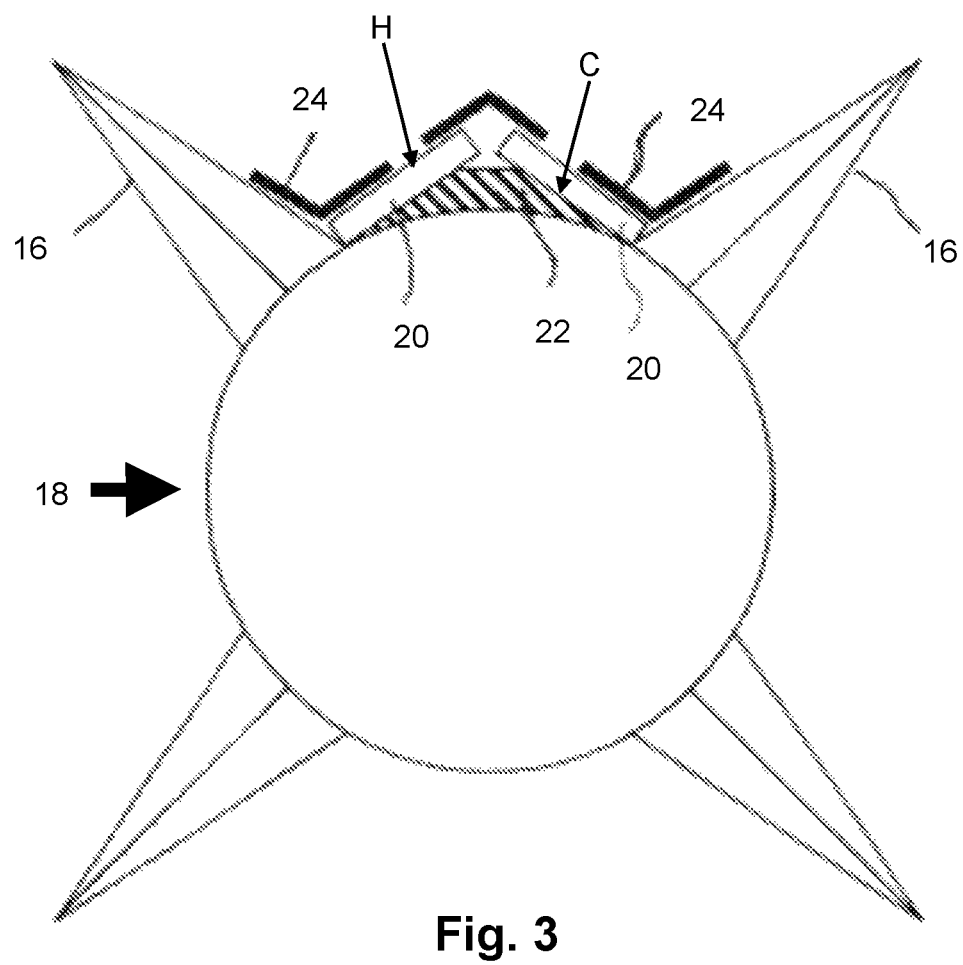
FIG. 3 is a diagrammatic illustration showing mounting details of a Peltier cooler of the invention mounted to a missile skin.

As shown in FIG. 3, a thermal paste 22 may be used between the surface of the missile and the cold side C of the Peltier tiles in order to efficiently transfer heat from the missile skin to the Peltier tiles. Such transfer of heat from the skin of the missile cools the interior of the missile, preventing these interior components or compartments from overheating. Depending on the type of Thermal paste 22 used, it may also provide an adhesive function to aid in retaining the Peltier Cooler tile assembly on the missile body. In some embodiments, tape 24 may be used to attach the Peltier cooling tiles to the missile 18, the attachment being sufficiently strong so as to hold the tile assembly on the missile body during transport but sufficiently weak so that the tile assembly is detached from the missile body during launch of the missile, as will be further explained.

One example of a thermal tile from which a tile assembly 20 may be made is a high performance thermoelectric cooler part no. HP-127-1:0-1.3-71 available from TE Technology, Inc., located in Traverse City, Mich. These particular thermoelectric tiles are 30 mm square, 3.6 mm high and 3.9 mm thick, although there are many different types, styles and sizes available from this and other vendors. Each of these particular tiles will transfer about 30 watts of heat from the surface of a missile using about 3.5 amps of 12-16 volt DC current. While these specific Peltier tiles are mentioned, it should be noted that there are a number of Peltier junction manufacturers that manufacture similar Peltier tiles that would likewise work. As such, it has been estimated that about 8 such thermoelectric tiles covering approximately a square foot of area between the forward fins 16 of a Sidewinder missile would dissipate about 240 watts of heat using 336 watts to about 448 watts of DC power from a power source, as provided by an aircraft electrical system or other source of DC power. Such power would be provided by a power cord 26 (FIG. 2) very similar to an existing umbilical power cord 26 on missile 10. In some instances, an electrical Y junction may be provided to the missile's umbilical cord to route power from the umbilical cord to the Peltier junction assembly. In other instances, an additional power cord may be provided to power the Peltier cooler assembly. In addition to power conductors for powering the Peltier assembly 20, other conductors in the power cord may be provided and attached to sensors in or at the Peltier cooler assembly, such as temperature monitors. The power cord may also be provided with a metallic, fabric or plastic core for strength in order to ensure that the power cord pulls the Peltier cooler assembly free when the missile is launched. In other instance a separate cord may be provided to pull the Peltier assembly from the missile. Likewise, an attachment point for where the power cord or other cord is attached to the Peltier cooler junction would be reinforced to ensure that the Peltier assembly itself is pulled free from a launched missile.

The Peltier assembly may be electrically connected together in any manner in accordance with its electrical characteristics. The individual tiles or sets of tiles may be connected in series to divide standard aircraft 28 VDC among the various individual tiles or sets of tiles, or in parallel with a lower voltage but higher current source. As with any Peltier cooling device, voltage or current may be controlled to regulate temperature if necessary. While 8 tiles are disclosed to cover about a square foot of the missile skin, it should be apparent that more or fewer tiles may be used to cover a larger or smaller area, respectively.

Figure 4:
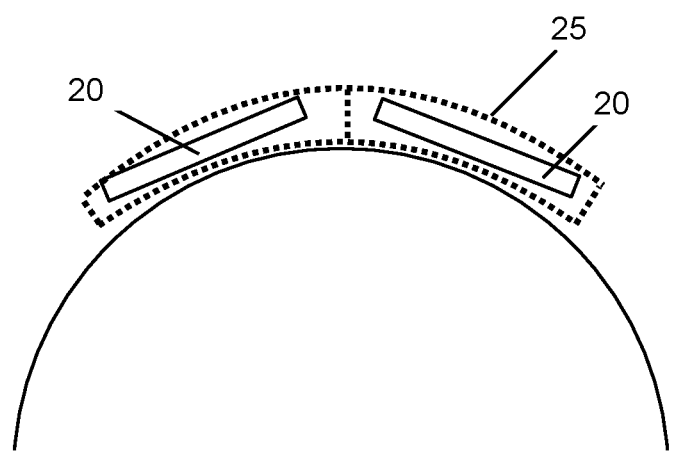
FIG. 4 is a diagrammatic illustration showing a Peltier cooler assembly comprising a conductive metal mesh.

The individual tiles of the Peltier cooler assembly 20 may be configured in any way that would closely fit the contour of the missile skin where the assembly is applied. To facilitate this, some form of structure is needed to hold the tiles together in an assembly that is sufficiently robust so as to remain intact as the tile assembly is pulled from the missile. One contemplated embodiment may utilize a fine metallic fabric-like heat conductive mesh 25 (FIG. 4), such as aluminum, copper or one of the wire cloths such as are available from Unique Wire Weaving company, Inc., of Hillside, N.J. Of these wire cloths, phosphor bronze, nickel, stainless steel or silver may be good heat transfer candidates for the instant invention in conjunction with thermal paste. These cloths have bending properties and thickness of light cardboard, and would hold their shape when conformed to the skin of a missile. As such, the wire cloth or the like would be configured as a bag or sock that holds the individual tiles together in a contourable assembly so as to be closely contoured to the missile skin. Where such a metallic sock is used, the Peltier tiles may be of the potted type so as to prevent electrical shorts. Likewise, wire connections between the tiles would be insulated, as by insulated crimp connectors, wire nuts, silicone or the like. In some embodiments the wire cloth may be attached to one side or both sides of the Peltier tiles, as by bonding with a heat conductive cement or the like so as to generally maintain the shape of the assembly and to promote heat transfer through the metallic cloth. In other embodiments, it may be that only a single sheet of the metallic cloth is needed, the sheet attached to only one side, such as the cold side, of the Peltier tiles. Small heat sinks may be glued to the hot side of the tiles using a heat conductive glue. In other embodiments, a coarser screen similar to metallic window screen may be used, the screen attached to one side or both sides as by bonding with a heat conductive glue. In addition to the use of heat conductive paste between the cold side of the assembly and missile skin, and as noted above, small patches of a relatively weak adhesive may be used at the corners or other locations of the assembly in order to keep the assembly in place during transport but which would easily release when the missile is launched.

In another embodiment, the individual Peltier tiles may be cast as a solid assembly using a rigid material as a matrix, and which would be contoured to closely fit the missile skin, leaving the hot and cold sides (H and C, FIG. 3) of the individual tiles exposed. This would form a relatively thin contoured cooling assembly where the Peltier cooling tiles would be held together at their edges.

In some of these embodiments an epoxy-type matrixcement may be used, while in other embodiments a ceramic or ceramic-like material may be used. In addition, a rubberized matrix material may be used so that the tile assembly would be at least semi flexible to conform to the missile skin. In other such embodiments, the rigid matrix material itself may be a heat conductive material that partially encloses the individual Peltier tiles, and would have more strength than an embodiment where the tiles are only held together at their edges.

Other embodiments may encapsulate edges of the Peltier tiles and partially encapsulate a hot side of the tiles, as by covering perhaps ⅛ to ¼ of the hot side area around their edges, while leaving the cold side exposed. In these rigid embodiments, the cold side of the assembly may be made smooth using the matrix material to conform to the missile skin. However, since the Peltier tiles are flat, only a small strip in the center of the tiles would actually contact the missile skin. In this case, heat transfer could still be accomplished by filling the matrix material with metallic particles. Here, potted Peltier tiles would be used to prevent electrical shorts. Conventional heat sinks may be glued to the hot side in these embodiments to make up for the loss of heat transfer from the encapsulated areas of the hot side. For that matter, heat sinks may be glued to the individual Peltier tiles of any embodiment of the instant invention.

In yet another embodiment, a Fiberglass-type material may be used to bond the individual Peltier tiles together into a solid assembly, leaving at least the cold sides exposed and most of the hot sides exposed, to which heat sinks may be glued.

Where deemed practical, and as noted, Peltier tiles that are curved in accordance with the contour of a missile may be fabricated and assembled together to form a curved assembly wherein the tiles themselves each closely fit the contour of the missile skin, as well as the entire assembly closely fitting the skin of a missile.

One way of constructing such an assembly of Peltier tiles would be to use a mold of the same contour as a missile skin where cooling is desired, such as the cylindrical area between the front fins of a Sidewinder missile, or actually using a missile body itself. The Peltier tiles, already being electrically connected together, would be laid out on the missile body with their hot sides up and their cold sides against the missile body. A liquid matrix compound, such as epoxy resin, fiberglass resin, a liquified rubberized compound that hardens to a flexible or semi-flexible state or any other suitable matrix compound as described above is squeezed or otherwise inserted into gaps between the tiles, and possibly underneath cold side edges of the flat tiles a short distance where the tiles do not contact the rounded missile body, delending on the viscosity of the matrix material. Such a dimension of matrix material on the cold sides of the tiles that are not flat against the missile skin may be ¼ inch, and tapering to 0 inches where the cold side touches the missile skin. Likewise, the matrix material may cover perhaps ⅛ inch to about ¼ inch around a periphery of the hot sides of the tiles, allowing an area where a heat sink may be bonded. Once the matrix has hardened or cured, the assembly is removed from the mold or missile body and is ready for use. The electrical cord or other cord is securely anchored in the matrix material to ensure that the assembly is pulled off the missile when it is launched.

For providing a temporary attachment of the Peltier assembly to the skin of a missile, and as noted, a weak glue may be used at corners of other locations of the Peltier assembly. Such a glue would be selected to easily separate when the missile is launched, but be sufficiently strong so as to hold the Peltier assembly to the missile skin during transport, as where there are a plurality of tube mounted missiles on a vehicle platform. In other embodiments, a tape, such as an all-purpose nonconductive tape such as fabric duct tape, may be used to hold the Peltier assembly to the missile skin. Again, such tapes would be selected to be sufficiently adhesive to hold the Peltier assembly in place while easily released to free the Peltier assembly during launch. In other embodiments, a thermally conductive paste may be developed that is sufficiently tacky or glue like so that the thermal paste itself holds the Peltier assembly in place but releases during launch.

In operation, the Peltier assembly is affixed by any of the described methods, or any method as would be apparent to one of average skill in the relevant arts after having read the instant disclosure, to the skin of a missile where heat generating components are located or where heat is dissipated by design from the missile. Where the missile is mounted to an aircraft, the mounting would be integrated with a missile launch rail or ejection mechanism, and only be operative while the aircraft is not flying. Once airborne, if the missile is launched, the Peltier cooler assembly is shorn torn away during launch, and separates and peels away from the missile largely due to its attachment to the launch rail via its umbilical cable, which at the end of its separation would ideally detach from the umbilical socket as well, leaving the whole Peltier Cooler assembly free from both the missile and the launch rail, making it a discarded appliance, not unlike a sabot. Depending on the detail of the design, it might remain attached to umbilical socket on the launch rail. This is not a problem for a land based launcher wherein the tube or canister would be subsequently re-serviced and reloaded for a subsequent future shot. Having a dangling appliance on the end of a launch rail on the tip of a aircraft wing is likely not desirable, and so for that case the Peltier cooler assembly would need to be designed to detach cleanly and completely from both the missile and the launch rail. Solution of these types of problems, although not always trivial, are typical for those practicing the art of airborne missile launch techniques and technologies.

Where the missile is ground launched, as from a vehicle mounted tube, the Peltier cooler assembly may be affixed to the missile skin prior to loading the missile into a tube and afterward the power cord plugged into the appropriate umbilical receptacle and anchored to ensure that the cord pulls the Peltier cooler assembly free during launch, Where convenient or otherwise preferred, the Peltier cooler assembly may be mounted to the missile skin after a vehicle carrying the loaded tubes is deployed. As noted, the appropriate tape, glue or thermal paste would be used to temporarily hold the Peltier cooler assembly in place. While in a readiness state, the Peltier cooler assembly is powered to cool the location of the missile directly underneath the Peltier cooler assembly, extracting heat from the missile interior and allowing the seeker targeting sensors to be effectively cooled. This allows the missile to be launched on a moment's notice without having to wait for the seeker sensors to cool down. It also allows all the missiles in a magazine of tubes or canisters to all be ready at the same time.

The components of the various embodiments may be used in any combination as deemed appropriate, and in any modality. For instance, while the disclosed Peltier cooling tiles are flat and the missile skin is curved, thermal paste may be used to fill the voids where the tiles do not contact the missile skin. Further, since the Peltier cooler assembly is about 1 square foot in area, the area of the skin covered would still radiate heat into the Peltier cooling tiles where they do not touch the missile skin. Where the tiles are integrated into a contoured rigid assembly that closely fits the skin of a missile, heat from the skin would still be conducted into the tiles to be dissipated. In other embodiments where the Peltier tiles are bonded together with the cold side contoured by the bonding material to closely fit the missile skin, a thin sheet of heat conductive material such as aluminum or copper foil may be placed between the Peltier assembly and missile skin in order to spread and dissipate the heat to the individual tiles. This would eliminate the need for conductive paste, which may be found to be objectionable for one reason or another. In the case of a Sidewinder missile launched from the ground from a tube or rail, provisions may be made to ensure the missile fins do not strike the assembly as the missile leaves its tube or rail. Such provisions would simply entail pulling the assembly out of the way after it detaches from the missile body. For a tube launched embodiment, and since the Peltier cooler assembly is at the nose of a Sidewinder missile, the electrical or other cord that detaches the assembly from the missile could be attached near or at the top of the outside end of the tube from which the missile emerges, and of a sufficient length so that the Peltier assembly is flipped by inertia up and over the end of the tube after the assembly is detached from the launched missile.

Having thus disclosed my invention and the manner of its use, it should be apparent to those skilled in the relevant arts that incidental changes may be made thereto that fairly fall within the scope of the following appended claims, wherein I claim:

1. A method for cooling at least a portion of a stationary missile in a ready-to launch standby mode of operation, said method comprising:

applying a cold side of a cooling assembly comprising a plurality of Peltier cooling tiles to an application site in apposition to, or in contact with, the skin of the missile under which a component of the missile is to be cooled while the missile is in said ready to launch standby state;

attaching the cooling assembly to the application site using attaching means to retain the cooling assembly at the application site;

electrically powering the cooling assembly to cool the application site, thereby cooling the component of the missile to be cooled; and connecting a detaching means to the cooling assembly such that, upon a launch of the missile, the cooling assembly is removed from the application site without interfering with the launch of the missile;

wherein said attaching means are configured to retain the cooling assembly at the application site during transport and handling of the missile and said detaching means are configured to detach the cooling assembly from the application site during a launch of the missile.

2. The method of claim 1, further comprising assembling the plurality of Peltier cooling tiles into the cooling assembly.

3. The method of claim 1, wherein the cooling assembly conforms to a curved surface on the skin of the missile.

4. The method of claim 1, wherein the plurality of Peltier cooling tiles are in direct contact with the skin of the missile.

5. The method of claim 1, wherein the cooling assembly comprises a frame or holder that holds the plurality of Peltier cooling tiles in a shape that conforms to a shape of the application site.

6. The method of claim 1, wherein the application site faces a launch rail for guiding said missile during launch and the cooling assembly is retained within a space between the missile and the launch rail by said attaching means.

7. The method of claim 1, further comprising applying a thermal paste or a metal foil to either the application site or to the cold side of the cooling assembly before applying the cold side of the cooling assembly to the application site.

8. The method of claim 7, comprising applying a thermal paste to either the application site or to the cold side of the cooling assembly before applying the cold side of the cooling assembly to the application site and wherein the thermal paste acts as an adhesive attaching means.

9. The method of claim 1, wherein said electrically powering the cooling assembly is provided by electrical connection of the cooling assembly to an umbilical cord of the missile and said umbilical cord acts as the detaching means.

10. The method of claim 1, wherein said electrically powering the cooling assembly is provided by electrical connection of the cooling assembly to a power cord configured for, and comprising a tensile strength sufficient, to pull the cooling assembly off of the application site when the missile is launched.

11. The method of claim 1, wherein the detaching means comprises an anchored cord having sufficient tensile strength to pull the cooling assembly from the application site.

12. The method of claim 1, wherein the plurality of Peltier cooling tiles are contained within a heat conductive mesh that holds the cooling tiles together in a flexible assembly that is applied at the application site.

13. The method of claim 1, wherein the cooling assembly comprises a plurality of Peltier cooling tiles cast as a solid assembly in a rigid matrix material to conform to a surface of the application site.

14. The method of claim 13, wherein the rigid matrix material comprises an epoxy resin, fiberglass, a rubber, metal particles, or combinations of these.

\* \* \* \* \*